United States Patent [19]

Inukai et al.

[11] Patent Number: 4,813,920

[45] Date of Patent: Mar. 21, 1989

[54] V BELT WITH BLOCKS

[75] Inventors: Masahiro Inukai; Hiroshi Matsuoka, both of Kobe, Japan

[73] Assignee: Bando Chemical Industries, Ltd., Hyogo, Japan

[21] Appl. No.: 90,064

[22] Filed: Aug. 27, 1987

[30] Foreign Application Priority Data

Aug. 28, 1986 [JP] Japan ............................ 61-132455[U]
Sep. 30, 1986 [JP] Japan ............................ 61-150844[U]

[51] Int. Cl.⁴ .............................................. F16G 5/16
[52] U.S. Cl. ...................................... 474/240; 474/242
[58] Field of Search ................. 474/201, 240, 242, 237

[56] References Cited

U.S. PATENT DOCUMENTS

| 3,949,621 | 4/1976 | Beusink et al. ................. 474/242 X |
| 4,177,687 | 12/1979 | Russ ....................................... 474/242 |
| 4,595,385 | 6/1986 | Henderson ........................... 474/201 |
| 4,655,732 | 4/1987 | Takashima ....................... 474/242 X |
| 4,734,085 | 3/1988 | Takashima et al. ............ 474/201 X |

FOREIGN PATENT DOCUMENTS

| 0047585 | 3/1982 | European Pat. Off. . |
| 2540953 | 2/1983 | European Pat. Off. . |
| 0177238 | 4/1986 | European Pat. Off. . |
| 46-4861 | 11/1971 | Japan . |
| 55-27595 | 2/1980 | Japan . |
| 56-76745 | 6/1981 | Japan . |
| 57-79347 | 5/1982 | Japan . |
| 57-28815 | 6/1982 | Japan . |
| 59-77147 | 5/1984 | Japan . |
| 60-49151 | 3/1985 | Japan . |
| 60-177351 | 4/1985 | Japan . |
| 60-101246 | 7/1985 | Japan . |
| 61-73949 | 5/1986 | Japan . |
| 61-206847 | 9/1986 | Japan . |
| 62-54348 | 4/1987 | Japan . |
| 2030263 | 4/1980 | United Kingdom . |

Primary Examiner—Thuy M. Bui
Attorney, Agent, or Firm—Armstrong, Nikaido Marmelstein & Kubovcik

[57] ABSTRACT

A V belt for high load transmitting having at least one endless load carrier and a plurality of blocks engaged with the load carrier in the lengthwise direction of belt. The center of gravity of the block is situated near the tensile members of the load carrier. The block, in the straight running state, is so supported that it is substantially perpendicular to the load carrier. Also, the block has the surface of arcuate shape in cross section at least at a part of its side surface.

7 Claims, 7 Drawing Sheets (a)

(b)

(a)

(b)

V BELT WITH BLOCKS

BACKGROUND OF THE INVENTION

1. Field of the invention

This invention relates to a V belt for high load transmitting, comprising endless load carriers and a plurality of blocks to be engaged with each of said load carriers.

The V belt according to the present invention is usable not only as the V belt of a continuously variable transmission for motor vehicles but also as the V belt of a continouly variable or uncontinuously variable transmission for vehicles loaded with engines, such as agricultural machines and civil engineering machines. It is also suitable for a V belt for high load for general industrial machines to be driven by electric motors.

2. Description of the prior art

For a transmission for running of a motor vehicle, a combine, a tractor or the like, a gear type transmission or an oil pressure type transmission is used. However, for the purposes of improving workability, saving fuel expenses, etc., development of a belt type continuously variable transmission is in progress.

The belt to be used for this belt type continuously variable transmission is required to have high torque transmitting ability, but the conventional rubber V belt is not useful for such belt type continuously variable transmission because it cannot stand high lateral pressure, namely, it buckles and deforms by high lateral pressure.

Various types of transmission for high load transmitting have been suggested up to now (for example, Japanese Patent Application Laying Open Gazettes No. 46-4861, No. 55-27595. No. 56-76745, No. 59-77147 and No. 61-206847). The applicants themselves have suggested the V belt of such construction that a plurality of blocks are engaged with an endless load carrier in the lengthwise direction of belt (U.S. Pat. No. 4,655,732 corresponding to Japanese Patent Application Laying Open Gazette No. 60-49151). The applicants have also filed patent applications for V belt of similar type (U.S. Pat. No. 903,346 now U.S. Pat. No. 4,734,085 and No. 34,461).

The conventional block for such V belt is so shaped that it is gradually small in shape toward the lower part (in the case where it is composed of material of the same specific gravity) and therefore its center of gravity is usually located at the upper side of the tensile member. In the case where reinforcing members or the like of different specific gravity are embedded within the location of the center of gravity varies with the reinforcing members or the like. Thus, no consideration has been given to the location of the center of gravity of the block.

Blocks whose center of gravity is biassed below the tensile member (toward the center of pulley) have been disclosed, for example, by Japanese Utility Model Registration Application Laying Open Gazettes No. 60-177351, No. 60-101246, No. 61-73949 and U.S. Pat. No. 4,595,385. Blocks whose center of gravity is biassed above the tensile member are disclosed, for example, by Japanese Patent Application Gazettes No. 57-79347 and No. 57-28815.

A pulley on which such B belt is wound comprises movable sheaves and fixed sheaves, both of truncated cone shape of the same angle. As shown in FIG. 17(a) and FIG. 17(b), it is so designed that when the block 101 engaged with the load carrier advances into a pulley groove of a pulley 102 and engages with pulley groove surfaces 102a, 102b, no gap is left between side surfaces 101a, 101b of the block 101 and the pulley groove surfaces 102a, 102b, in the base where the block 101 stands perpendicularly in relation to the load carrier (namely, in the case where the center line S of the block 101 coincides with the radial direction R of the pulley 102). (Please refer to FIG. 17(b)). W designates the center line of the tensile member of load carrier.

In the V belt as stated above, as shown by FIG. 18(a), when the block 101 engages with groove surfaces 102a, 102b of the pulley 102, if the upper part of the block 101 inclines to the T side in the rotational direction of the pulley, groove surfaces 102a, 102b of the pulley 102 take the shape of a hyperbolic curve, in the cross section at the center line, and also form the pulley angle which is smaller than the angle formed by both side surfaces 101a, 101b of the block 101 and therefore only the upper end portion of the block 101 makes contact with pulley groove surfaces 102a, 102b (refer to FIG.18(b)). Therefore, when the block 101 engages with groove surfaces 102a, 102b of the pulley 102, rocking of the block 101 is caused, with $P_1$ (the upper end portion of the block 101 at which the block 101 and pulley groove surfaces 102a, 102b make contact with each other) as a fulcrum and the groove in which the load carrier is fitted as a working point. This is proved by the following fact.

If comparison is made between the case where the point a is given at the position above the groove 101c in which the load carrier of the block 101 is fitted and the center line of the block 101 coincides with the radial direction R of the pulley 102 with the point a fixed on pulley groove surfaces 102a, 102b (refer to chain lines in FIG. 19) and the case where the center of the block 101 inclines at an angle θ to the radial direction R, it is found out that in the case of the latter (the block 101 inclines at an angle θ to the pulley radial direction R) the groove 101c of the block 101 in which the load carrier is fitted is situated more away from the center O of pulley rotation and accordingly the block 101 is moved to the position where it stands perpendicularly on the pulley due to pressing force F of the load carrier wound on the pulley 102 to the rotational center O of the pulley.

On the contrary, as shown by FIG. 20(a), if the lower part of the block 101 inclines to T side in pulley rotational direction when the block 101 engages with pulley groove surfaces 102a, 102b of the pulley 102, the cross section at the center line of the block indicates that as shown by FIG. 20 (b), the pulley groove surfaces 102a, 102b take the shape of a hyperbolic curve and also form a small pulley angle in relation to the block angle. Therefore, similarly to the above-mentioned case, when the block 101 engages with pulley groove surfaces of the pulley 102, only the upper end portion of the block makes contact with the pulley groove surfaces 102a, 102b and rocking of the block 101 is caused, with the contact part $P_2$ as a fulcrum point and the groove in which the load carrier is fitted as a working point.

As mentioned above, in the case where the block 101 inclines to the pulley radial direction when the block engages with the pulley 102, rocking of the block 101 is caused and accordingly friction is generated at the part where the block 101 engages with the load carrier and this friction involves the generation of heat and resultant partial temperature rise of the block and the load carrier. This naturally causes ageing due to heat on rubber composing the load carrier. Thus, the load carrier cracks and if cracks reach the tensile member, earlier breakage of the load carrier occurs.

As stated above, if the block inclines to the pulley radial direction when the block engages with the pulley, only the upper end portion of the block makes contact with the pulley groove surfaces of the pulley. The means that the lateral pressure which should be received by the whole of the block side surface concentrates upon the upper end portion of the block, causing chipping and early damage of blocks. It is therefore necessary to engage the block with the pulley, with the block coinciding with the pulley radial direction.

SUMMARY OF THE INVENTION

With the above in view, the present invention has for its object to provide V belts for high load transmitting which are free from rocking of blocks when the belt was engaged with the pulley.

In order to attain the above object, the V belt according to the present invention has a plurality of blocks with engage with at least one endless load carrier in the lengthwise direction of belt and are provided with means of holding the blocks in substantially perpendicular state in relation to the load carrier in the straight running state.

The V belt according to the present invention comprises at least one endless load carrier having tensile members and a plurality of blocks which are engaged with the load carriers in the lengthwise direction of belt. The center of gravity of the block is situated near the tensile member of the load carrier. Therefore, in the straight running state before the belt is wound on the pulley, the block is supported in substantially perpendicular state in relation to the load carrier and accordingly the block engages with the pulley in the state that it coincides with the radial direction of pulley and rocking of the block on the pulley does not occur. Thus, generation of heat at the part where the block and the load carrier engage with each other and concentration of lateral pressure on that part can be prevented and accordingly the belt life is prolonged.

In the V belt according to the present invention, the center of gravity of each block is situated near the tensile member of the load carrier. This is because (i) if the center of gravity of the block is biassed to the upper part of the block, the upper part of the block inclines contrary to the belt running direction due to resistance of air during straight running and (ii) if the center of gravity of the block is biassed to the lower part of the block, the upper part of the block inclines to the belt running direction and such trouble as mentioned above occurs.

The V belt according to the present invention is characterized in that a plurality of blocks are engaged with an endless load carrier having tensile members in the lengthwise direction of belt and side surfaces of said block are formed in arcuate shape in cross section at least at a part thereof. Therefore, as the center part of the width of the block makes a linear contact with a pulley on which a belt is wound, concentration of lateral pressure upon a part of the block can be avoided.

The above and other objects and novel features of the present invention will be more apparent from the following description made with reference to the accompanying drawings.

BRIEF DESCRIPTION OF THE DRAWINGS

The accompanying drawings show preferred embodiments of the present invention, in which.

DETAILED DESCRIPTION OF THE INVENTION

Preferred embodiments of the present invention are described below with reference to the accompanying drawings.

Figure 1:
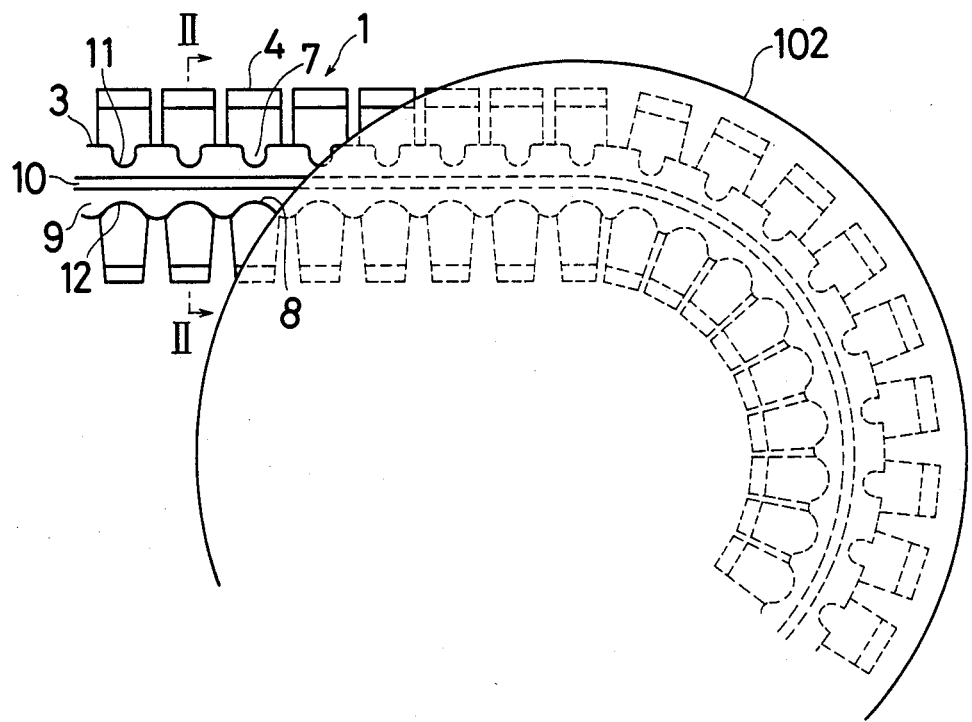
FIG. 1 is a side view of a V belt for high load transmitting according to the present invention.
Figure 2:
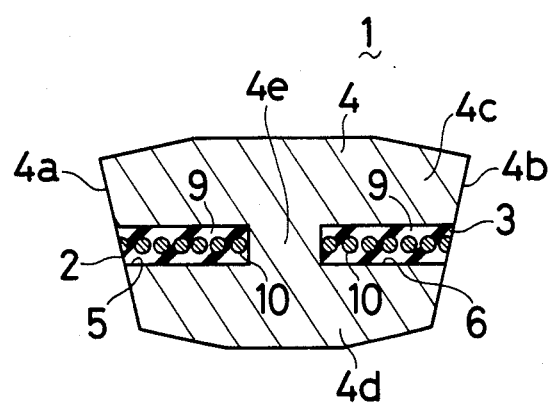
FIG. 2 is a cross sectional view, taken along the line II—II in FIG. 1.

As shown in FIG. 1 and FIG. 2, the V belt 1 according to the present invention comprises a pair of load carriers 2, 3 and a plurality of blocks 4 engaged with said load carriers in the lengthwise direction thereof. Grooves 5, 6 in which load carriers are fitted detachably and which are open at side surfaces 4a, 4b of the block 4 are formed at each side of the block. A convexed part (only a convexed part 7 is shown for the groove 6) is provided at the upper surface of each groove 5, 6 and the upper surface is a curved convex surface (only a curved convex surface 8 is shown for the groove 6), namely, the block 4 comprises an upper beam part 4c, a lower beam part 4d and a center pillar part 4e which connects center parts of the upper and lower beam parts and extend in vertical direction.

The load carrier 2, 3 has a rubber member 9 and tensile members 10 embedded in the rubber member. Where necessary, canvas is provided at the upper and the lower surfaces of the rubber member 9. Provided at the upper and the lower surfaces of the load carriers 2, 3 are concaved parts (only concaved parts 11, 12 of the load carrier 3 are shown) which engage with the convexed part or the curved convex part of the grooves 5, 6 of the block 4. The convexed part 7 and the curved convex surface 8 are engaged with the concaved parts 11, 12. Thus, the load carriers 2, 3 and the blocks 4 are fixed together in the lengthwise direction of belt by the engagement of convex and concave.

Figure 3:
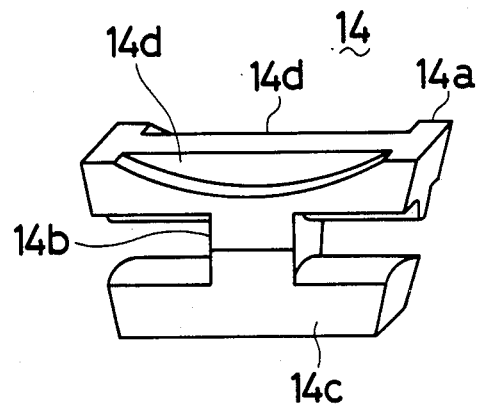
FIG. 3 is a perspective view of a different block.
Figure 4:
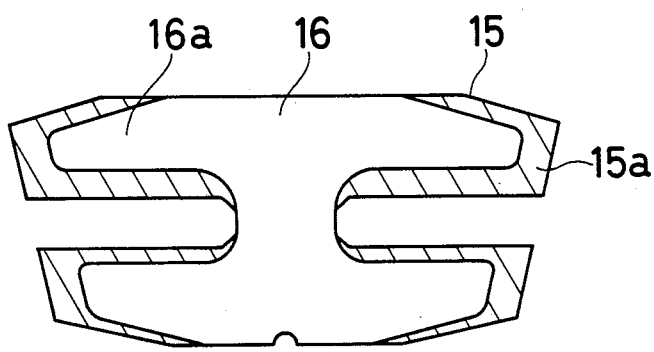
FIG. 4 is a cross sectional view of a block having a reinforcing member.

As stated above, in the case where the block of the V belt is composed of material of the same specific gravity, the upper part of the block is larger is shape than the lower part and therefore the center of gravity is usually situated at the upper part of the tensile member. With this in view, in this embodiment a part of the upper and the lower parts of the block 4 is cut off to adjust the situation of the center of gravity. By this adjustment of the center of gravity, in the engagement of the block with the load carriers 2, 3 the center of gravity is situated centrally of said block and near the tensile members 10 of the load carriers 2, 3 and accordingly, the center line of the block 4 is supported perpendicularly in relation to the load carrier 3 (tensile member 10) in the straight running state. As shown in FIG. 3, the situation of the center of gravity can be adjusted by providing a concaved part 14d at an upper beam part 14a of the block 14 comprising the upper beam part 14a, a center pillar part 14b and a lower beam part 14c and by varying the cubic volume of the concaved part 14d. In the case where a concaved part is provided at the lower beam part 14c for the purpose of making the block lighter in weight, the situation of the center of gravity is adjusted by varying the cubic volume of the concaved parts of the upper and the lower beams 14a, 14c.

As stated above, the situation of the center of gravity can be adjusted by a partial cut of the block, formation of concaved part, etc. In addition, adjustment of the situation of the center of gravity can be done by making the cubic volume of the part above the tensile members smaller by reducing the height of the upper beam part of the block or by making the cubic volume of the part below the tensile members larger by increasing the height of the lower beam part of the block.

Furthermore, in the case where a reinforcing member 16 (a reinforcing member made of metallic or other material having a higher specific strength than resin material composing the main part of a block and a larger specific gravity) is embedded in a block 15, the situation of the center of gravity can be adjusted by the weight regulation, such as be decreasing the cubic volume of an upper side part 16a of a reinforcing member 16 in an upper beam part 15a of the block which is above the tensile members of the load carrier.

Resin materials which constitute the main part of a block are thermoplastic resin, such as 6.6 nylon, aromatic nylon, polyethyleneterephthalate, etc., thermosetting resin, such as phenol resin, hard polyurethane, unsaturated polyester, polyimide, epoxi resin, etc., hard rubber, such as ebonite. These are used singly or in compounding with short fiber, fillers, friction regulating agent or the like.

As to the reinforcing member, it is, for example, FRP reinforced with metallic material, long fiber, such as carbon fiber, glass fiber, alumina fiber, aramid fiber or the like.

Situation of the center of gravity of the block 4 near the tensile member 10 of the load carrier 2, 3 means that the center of gravity of the block 4 is situated within the range of the diameter of the tensile member 10 in the vertical direction of the block in the center pillar part 4e.

Under the above construction, before the V belt 1 engages with the pulley the load carrier 3 is in linear state and the block 4 is substantially perpendicular to said load carrier 3, engagement of the block 4 with the pulley in this state is such that the block 4 engages with the pulley in the state that it coincides with the diametrical direction of the pulley and rocking of the block 4 on the pulley does not occur. Therefore, generation of heat at the part where the block engages with the load carrier 2, 3 does not take place, with the result that degradation by heat of the rubber member 9 of the load carrier 2, 3 can be prevented and the partial striking of the block against the pulley can also be prevented. Thus, lateral pressure to the block 4 is dispersed and the belt life is prolonged.

An explanation is made below about the test carried out with the V belt according to the present invention.

Figure 6:
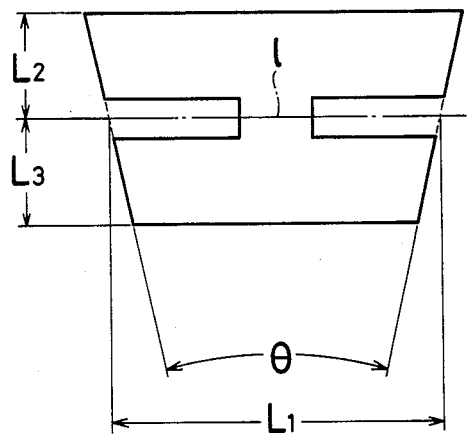
FIG. 5 and FIG. 6 are explanatory drawings of the method of testing.
Figure 5:
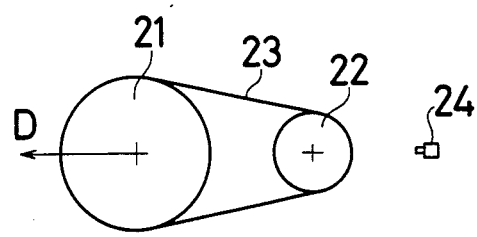

As shown in FIG. 5, a sample belt 23 was wound round between a driving pulley 21 (pitch diameter 155 mm, number of revolutions of pulley 5,600 rpm, axial load D=100 kgf) and a driven pulley 22 (pitch diameter 80 mm), and was run in no-load state and the belt temperature was measured by measuring the temperature of the back of the belt wound on the driven pulley 22 by an infrared radiothermometer 24 (TTG-3200 made by Nihon Denshi K.K.). Measuring of the belt temperature at this part is most suitable for measuring the temperature of a running load carrier because the block on the back side of the belt 23 opens by the belt being bent on the driven pulley 22 and therefore the load carrier becomes easy to see. The basic measurements of the block used in the test are, as shown in FIG. 6, $\theta = 26°$ $L_1 = 40$ mm and $L_2 = L_3 = 10$ mm (l shows the situation of the tensile member of the load carrier). The diameter of the tensile member of the load carrier is 2 mm.

The method employed for changing the situation of the center of gravity of the block was to cut off an upper end portion of the block and to rivet the part below the tensile member or to cut off a lower end portion of the block and to rivet the part above the tensile member. No change was made in the weight of a block by balancing the decrease in weight by cutting off with the increase in weight by riveting.

The results of the above test are as shown in the following table. As to the situation of the center of gravity, it was measured on the basis of the situation of tensile member=0, upper side=positive, and lower side=negative. The temperature rise is the difference between the measured value and the room temperature.

| Sample number | 1 | 2 | 3 | 4 | 5 | 6 |
|---|---|---|---|---|---|---|
| Situation of the center of gravity (mm) | −0.77 | 0.23 | 0 | 0.2 | 0.5 | 1.0 |
| Temperature rise (°C.) | 65.2 | 60 | 56.8 | 61.6 | 66.9 | 74.5 |
| Belt life (Hrs) | 183 | 200 or more | 200 or more | 200 or more | 187 | 91 |

From the above test results, it can be seen that the nearer the enter of gravity to the situation of tensile member, the lower the running belt temperature is kept and in the case where the situation of the center of gravity coincides with the tensile member, the running belt temperature is kept the lowest. However, so long as the situation of the center of gravity is within the range of the diameter of tensile member of load carrier in vertical direction of the block, it is all right from the point of belt life.

Figure 7:
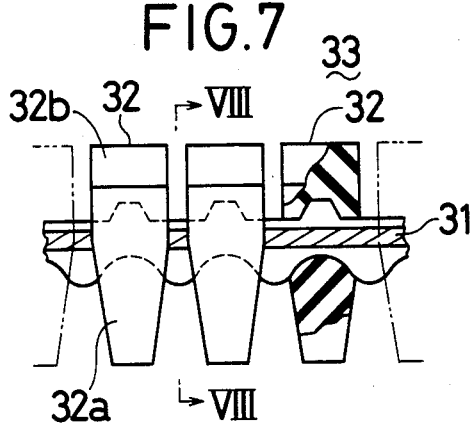
FIG. 7 is a side view of a main part of a different block, partly in section.
Figure 8:
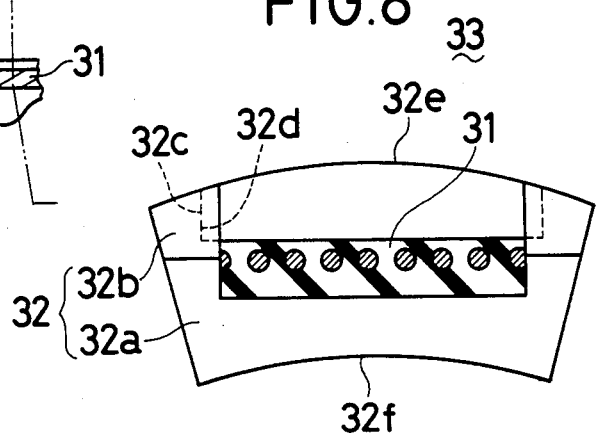
FIG. 8 is a cross sectional view, taken along the line VIII—VIII in FIG. 7.
Figure 9:
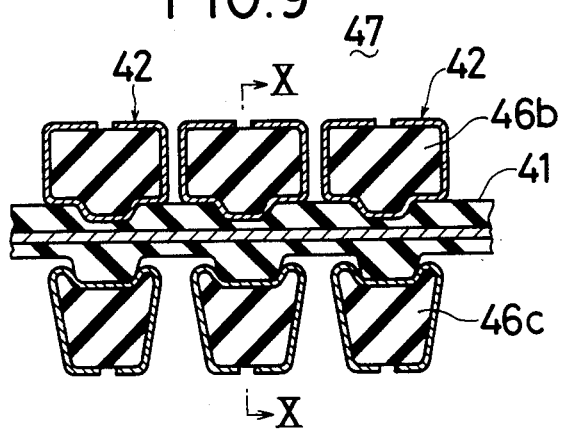
FIG. 9 is a cross sectional view of a further different block.
Figure 10:
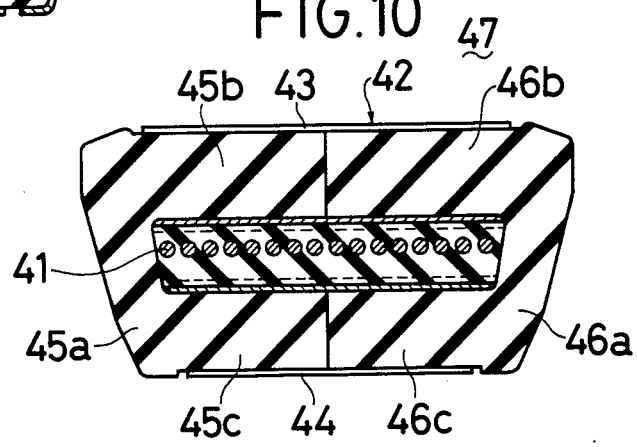
FIG. 10 is a cross sectional view, taken along the line X—X in FIG. 9.

The above embodiment is applied to the V belt with two load carrier but is applicable to the V belt with one load carrier (as disclosed by Japanese Patent Application Laying Open Gazettes No. 61-206847 and No. 62-54348), namely, is applicable to such V belt as shown in FIG. 7 and FIG. 8. This V belt 33 comprises one endless load carrier 31 and a plurality of blocks 32 through which said load carrier 31 passes and which are engaged with the load carrier 31. Each block 32 comprises a substantially U-shaped underside member 32a and an upper side member 32b which engages with said underside member 32a. A concaved part 32d formed at the upper side member 32b is engaged with a convexed part 32c formed at said underside member 32a in belt width direction. Furthermore, each block 32 is applicable to a V belt 33 with the upper surface 32e formed in convexed surface (convex in upper direction) and its under surface 32f formed in concaved surface (concave in upper direction). Also, the above embodiment is applicable to a V belt 47 as shown in FIG. 9 and FIG. 10. This V belt comprises an endless load carrier 41 and a plurality of blocks 42. Each block 42 comprises connected reinforcing members 43, 44, each having a hollow part, slant side parts 45a, 46a and a pair of friction members 45, 46, each having two leg parts 45b, 45c and 46b, 46c which are parallel with each other, in which the leg part of each friction member 45, 46 is inserted in the hollow part of the connected reinforcing member 43, 44 for contact with each other and the block 42 and the load carrier 41 are connected to each other. The V belt 33 and the V belt 47 can be adjusted so that the situation of the center of gravity is near the tensile member by adjusting the cubic volumes of the upper side member 32b and the lower side member 32a and by adjusting the cubic volumes of the leg parts 45b, 46b and the leg parts 45c, 46c or by adjusting the specific gravity of the connected reinforcing member respectively.

In any of the above embodiments, it is intended to prolong the life of belt by supporting the block substantially perpendicular in relation to the load carrier in the straight running state and thereby preventing rocking of the block in its engaging with the load carrier. However, in view of possible rocking of the block due to misalignment, it is suggested to restrict the lowering of belt life by the following arrangement.

Figure 11:
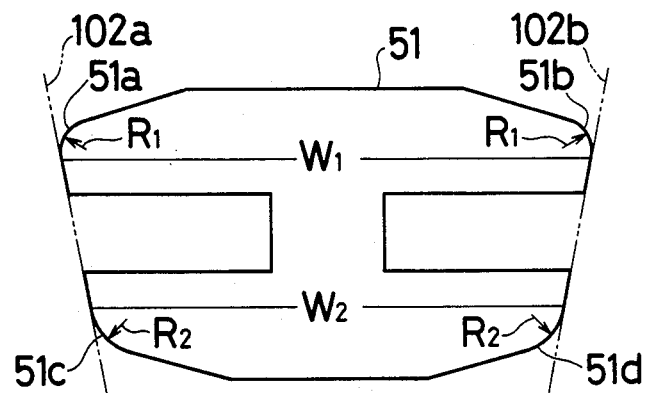
FIG. 11 and FIG. 12 are a front view and a plan view of the block respectively.

As shown in FIG. 11, in the cross section where upper side parts 51a, 51b and lower side parts 51c, 51d which are the part of the side surfaces of the block 51 make a right angle with the lengthwise direction of belt, each corner is formed in a roundish curved surface of a radius $R_1$, $R_2$ with a center in its inner part. Also, as shown in FIG. 12, in the cross section where the block 51 is horizontal and in parallel with the center line of the lengthwise direction of belt, each corner 51e, 51f, 51g, 51h is formed in a roundish curved surface of a radius $R_3$ with a center in its inner part.

Under the above formation, even if the width of pulley groove of the pulley on the driving side and that on the driven side varies when the speed is changed and misalignment is caused due to shifting of the center line and the V belt enters the pulley in slant state, no partial load is applied to the block 51 because the corner part of circular arc shape makes a linear contact with a pulley groove surface 102a, 102b of a pulley 102.

Figure 12:
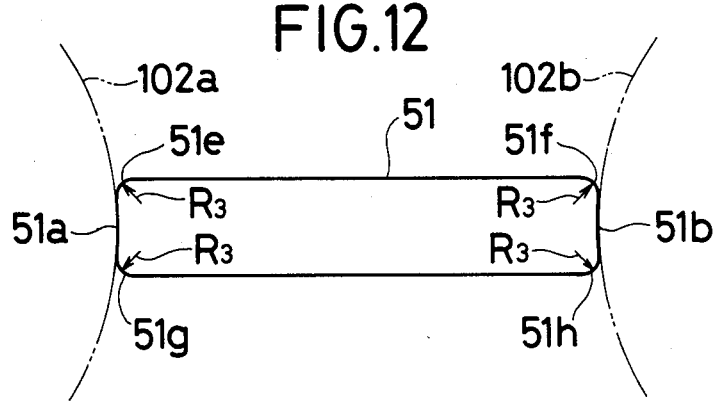
Figure 13:
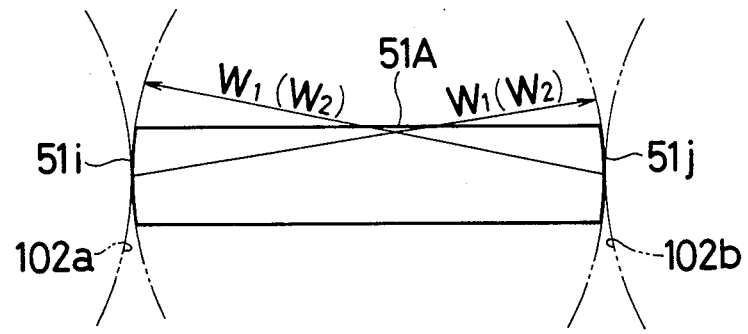
FIG. 13 is a drawing, similar to FIG. 12, of a different embodiment.

Instead of the formation shown in FIG. 12, as shown in FIG. 13 a different formation can be made, namely, in the cross section where the block 51A is horizontal and in parallel with the center line of the lengthwise direction of belt, the whole of both side surfaces of the block 51A are formed in a curved surface of a radius corresponding to the length of the width (upper beam part $W_1$, lower beam part $W_2$) of the block 51A. In this case, even if compressing action is applied to the side surface (51i, 51j) of the block 51A and the load carrier, such compressing action on the block 51 is small and breakage, cracking, etc. of the block can be avoided owing to the sliding surface which is a surface curved toward the outside of the block 51.

Figure 14:
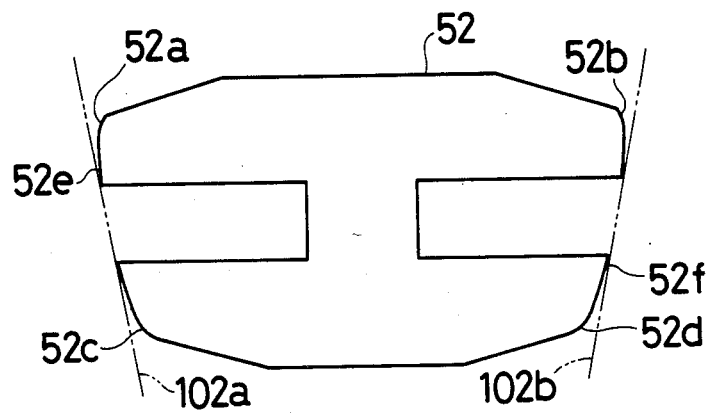
FIG. 14 to FIG. 16 are front views of the block of the other embodiment.

It is also suggested that as shown in FIG. 14, the side surface of the block is formed in a curved surface as a whole by making the portion between the roundish upper corner part 52a, 52b and the roundish lower corner part 52c, 52d into a surface 52e, 52f which is curved toward the outside of the block 52.

Figure 15:
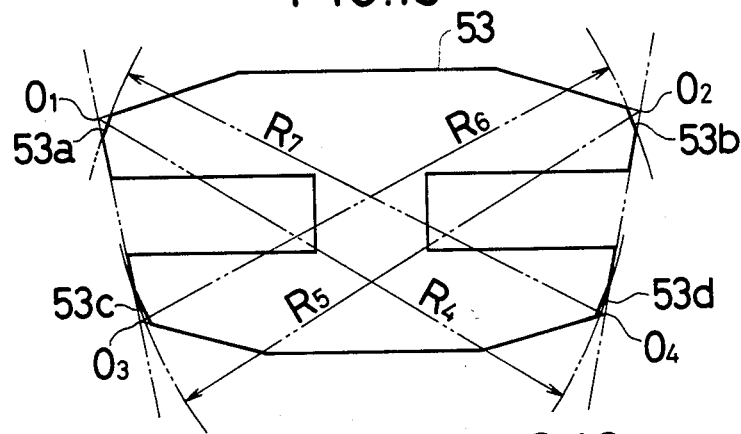

It is further suggested that as shown in FIG. 15, the surfaces which compose both side surfaces of the block 53 comprise a circular arc of a radius $R_4$ described at the corner part 53d of the opposite angle with the center $O_1$ placed near the corner part 53a, a circular arc of a radius $R_5$ described at the corner part 53c of the opposite angle with the center $O_2$ placed near the corner part 53b, a circular arc of a radius $R_6$ described at the corner part 53b of the opposite angle with the center $O_3$ placed near the corner part 53c, and a circular arc of a radius $R_7$ described at the corner part 53a of the opposite angle with the center $O_4$ placed near the corner part 53d.

Figure 16:
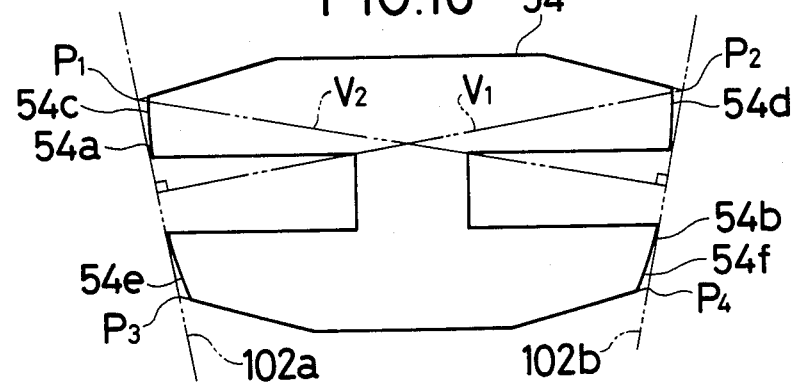
Figure 17:
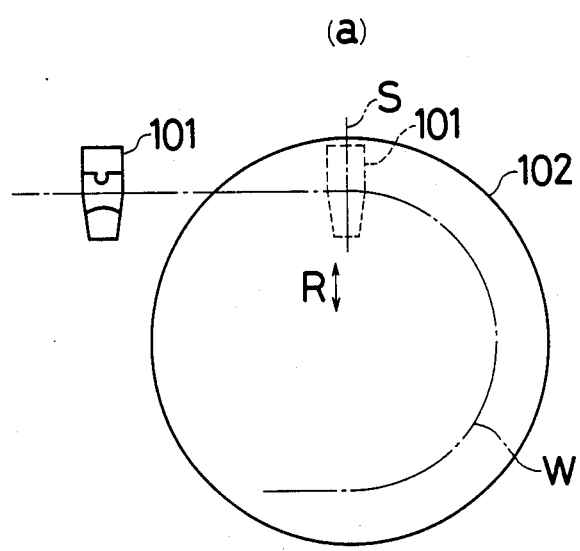
FIG. 17(a) and FIG. 17(b) are drawings showing the relation between the block and the pulley, in the case where the block does not incline to the load carriers.
Figure 17:
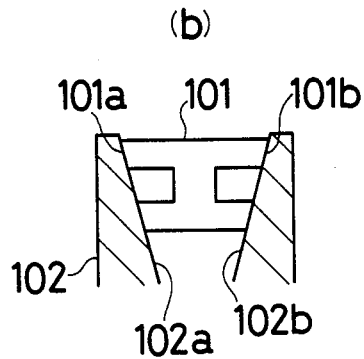
Figure 18:
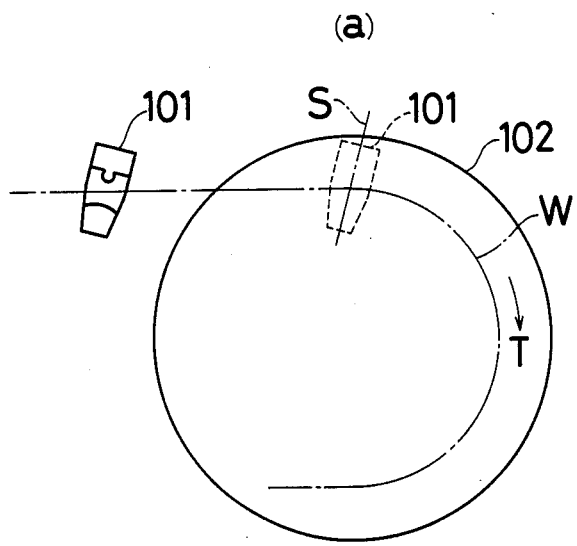
FIG. 18(a) and FIG. 18(b) are drawings, similar to FIG. 17(a) and FIG. 17(b), in the case where the upper part of the block inclines in the pulley rotational direction to the load carrier.
Figure 18:
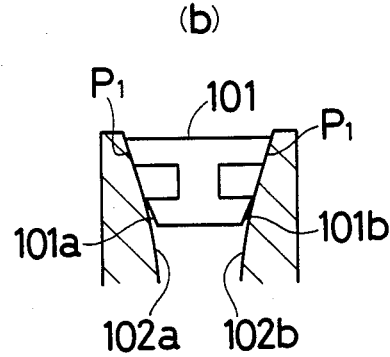
Figure 19:
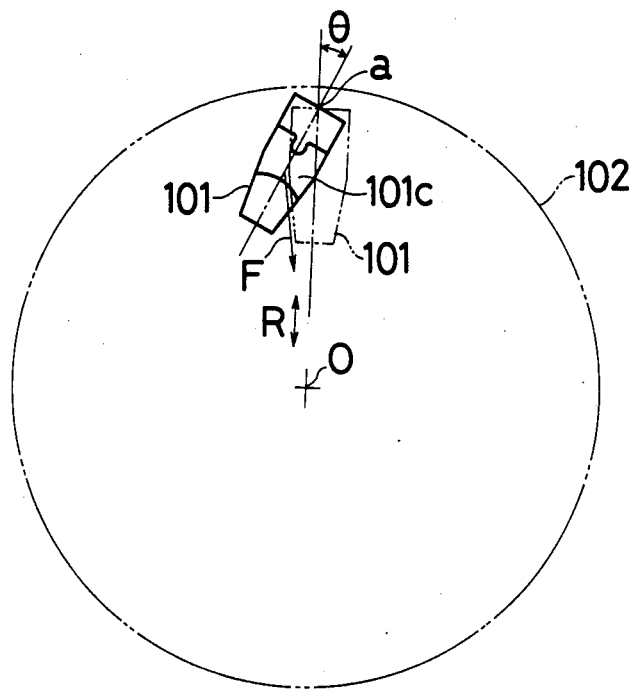
FIG. 19 is an explanatory drawing of the rocking of the block.
Figure 20:
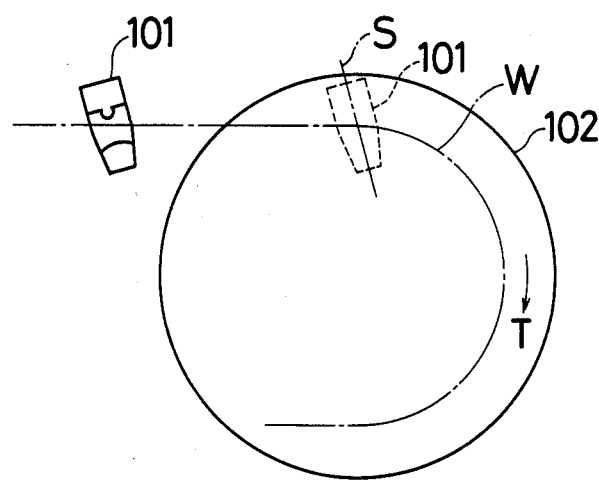
FIG. 20(a) and FIG. 20(b) are drawings, similar to FIG. 17(a) and FIG. 17(b), in the case where the lower part of the the block inclines in the pulley rotational direction to the load carriers.
Figure 20:
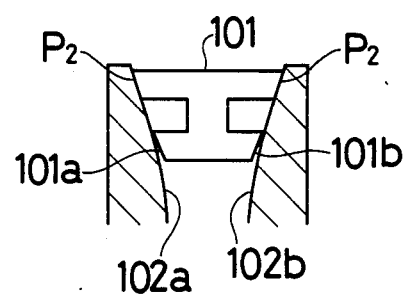

It is still further suggested that as shown in FIG. 16, on the supposition that points $P_1$, $P_2$, $P_3$, $P_4$ (upper and lower corners) of both side surfaces of the block 54 are on the chain line showing the pulley groove surface 102a, 102b of the pulley, corner parts 54c, 54d, 54e, 54f are formed by forming side surfaces 54a, 54b of curved surface shape by a circular arc of almost the same radius which is shorter than the length of each perpendicular $V_1$, $V_2$ which is drawn from the point $P_2$ of the block 54 to the line $P_1$, $P_3$ and from point $P_1$ to the line $P_2$, $P_4$ respectively. There is a case where the side surface 54a, 54b makes a linear contact with the pulley.

Under the above formations, even if the V belt enters the pulley in slant state, the block will be held in the specified position or in slightly sunk state at the worst because both side surfaces 54a, 54b of the block 54 are of circular arc shape in cross section. Thus, application of partial load to the corner part 54c, 54d, 54e, 54f and resultant breakage of the block 54 can be avoided.

Furthermore, it is suggested to combine the shape of block shown in FIG. 11, FIG. 14, FIG. 15 or FIG. 16 with that shown in FIG. 12 or FIG. 13. By making the whole of the side surfaces of the block a circular arc shape in cross section, it is possible to reduce compressing action on the block and also lessen the generation of vibration at every angle. Accordingly, no partial load is applied to the block and destructive power to the block can be avoided still further.

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A V belt for high load transmission comprising at least one endless load carrier having tensile members and a plurality of blocks engaged with said load carrier in the lengthwise direction of said belt, each said block includes a groove at least partly defined by upper and lower parts of said block, said load carrier is fitted in said groove in engagement with said upper part of said block, and the center of gravity of each said block is located centrally of said block and within the range of a diameter of a tensile member of said load carrier.

2. A V belt for high load transmission as defined by claim 1, wherein said groove is open at one side of the block, a plurality of concave surfaces are spaced lengthwise along an upper part of the load carrier, said upper part of each block is formed with a convex part adapted to engage one of said concave surfaces of said load carrier, and each of said blocks are engaged with the load carrier in the lengthwise direction of said belt by engagement of said convex part of said upper part of each block with one of said concave surfaces of said load carrier.

3. A V belt for high load transmission as defined by claim 1, wherein each block has a reinforcing member embedded therein.

4. A V belt for high load transmission as defined by claim 2, wherein said upper and lower parts of each block comprise an upper beam part and a lower beam part respectively and further including a center pillar part connecting the central parts of said upper and lower beam parts, a pair of grooves are formed by space encircled by said both beam parts and the center pillar part, each of said blocks is engaged with a pair of endless load carriers with each of said load carriers in one of said grooves and the center of gravity of each block is located in said center pillar part of each block.

5. A V belt for high load transmitting as defined in claim 1, wherein only one load carrier passes through a plurality of blocks.

6. A V belt for high load transmission comprising a pair of endless load carriers having tensile members and a plurality of blocks with each block having a pair of grooves in which said load carriers are detachably fitted in the width direction of each block, said load carriers having an upper part and said grooves being at least partly defined by an upper surface, a concaved part is formed at the upper part of the load carrier, a convexed part which engages with said concaved part is formed at the upper surface of the grooves of each block, each block is engaged with the load carrier in the lengthwise direction of said belt by engagement of said convexed part with said concaved part, and the center of gravity of each block is located centrally of said block and near the tensile members of the load carriers.

7. A V belt for high load transmission as defined by claim 6, wherein each block comprises an upper beam part, a lower beam part and a center pillar part connecting the central parts of said upper and lower beam parts, said pair of grooves are formed in each block by space encircled by said both beam parts and the center pillar part and the center of gravity of each block is located within the range of a diameter of the tensile members of the load carriers.

* * * * *